Patented June 6, 1939

2,160,942

UNITED STATES PATENT OFFICE 2,160,942

VINYLIDENE CHLORIDE CO-POLYMERS

Edgar C. Britton, Clyde W. Davis, and Fred Lowell Taylor, Midland, Mich., assignors to The Dow Chemical Company, Midland, Mich., a corporation of Michigan No Drawing. Application April 1, 1938, Serial No. 199,498

12 Claims. (Cl. 260—80)

This invention relates to the product obtained by polymerizing together monomeric vinylidene chloride and the monomer of at least one unsaturated ester of an inorganic acid, the alcohol residue in the ester having the general formula $$R-CH=\overset{R'}{\underset{|}{C}}-CH_2-$$

wherein one of the radicals R and R' is hydrogen, R is hydrogen, the phenyl radical, or a lower alkyl radical such as the methyl, ethyl and propyl radical, and R' is hydrogen, halogen, or a lower alkyl radical.

We have found that a variety of useful synthetic resinous and plastic products may be prepared by the co-polymerization of vinylidene chloride and one or more unsaturated alcohol esters of inorganic acids wherein the alcohol residue has the general formula given above. Such materials, herein referred to as co-polymers, may be prepared by heating together a mixture of the co-polymerizable materials at temperatures from about room temperature up to about 100° C. We have ordinarily deemed it expedient to carry out the co-polymerization in the presence of catalysts capable of accelerating the said reaction. Such catalysts include, for example, light, benzoyl peroxide, a mixture of benzoyl peroxide, chloroacetyl chloride, and tetraethyl lead, or a mixture of uranium nitrate or acetate and benzoyl peroxide, and the like. When uranium salts were employed in the catalyst mixture, the polymerizable materials were ordinarily subjected to the radiant energy from a mercury vapor lamp.

The co-polymers produced after subjecting the monomeric mixture to the conditions outlined above for a period varying from about 1 to 10 days, depending upon the activity of the particular mixture, varied in property from gel-like materials to hard brittle masses. Most of the products obtained were capable of being molded easily at moderate working temperatures. Some of the co-polymers, however, lack the necessary coherence to be readily molded. The softening point of all of the co-polymers produced was substantially lower than that of polymeric vinylidene chloride alone while in most cases the decomposition temperature of the co-polymer was substantially the same as that of polymeric vinylidene chloride.

Our new co-polymers are, in the main, insoluble in boiling ortho-dichlorobenzene. A few of the materials have been found to swell under the action of ortho-dichlorobenzene at its boiling point and in a few isolated instances, there appears to be some actual solution or dispersion of the co-polymer in the said solvent. The insolubility of most of our co-polymers in ortho-dichlorobenzene and similar solvents even at high temperatures is an indication of their general utility in the preparation of solvent-proof compositions.

Many of our new co-polymers are highly resistant to attack by concentrated sulphuric acid. Some of the materials discolor slightly on long standing in this reagent but do not appear to be decomposed thereby to any appreciable extent. It may be said in general that the co-polymers defined by the appended claims are quite resistant to the action of most common acids and alkalies and of most of the common organic solvents including the alcohols, hydrocarbons, chlorinated hydrocarbons, ketones, etc.

The following table illustrates the practice of our invention and describes some of the principal properties of various of our new co-polymers of vinylidene chloride and an unsaturated ester of the class described. In the table such ester is referred to as a "modifier", from its effect in modifying the properties of the co-polymer as compared with those of polymeric vinylidene chloride itself. Proportions of reagents are given in per cent by weight and the amount of modifier entering into the co-polymeric product is calculated from the chlorine analysis of the co-polymer obtained.

Table

| Run No. | Co-polymerizable material | Per cent modifier | Per cent vinylidene chloride | Polymerization temperature, °C. | Time, hrs. | Extent of polymerization, per cent | Per cent chlorine content | Per cent vinylidene chloride | Properties of co-polymeric products | | | |
|---|---|---|---|---|---|---|---|---|---|---|---|---|
| | | | | | | | | | Per cent modifier | Softening point, °C. | Decomposition temperature, °C. | Molding temperature, °C. |
| 1 | Triallyl borate | 25 | 75 | 30° for 66 hrs. 60° for 12 hrs. | | 24.5 | 68.18 | 93.0 | 7.0 | 130 | 160 | 130 |
| 2 | Allyl orthosilicate | 25 | 75 | 40° for 99 hrs. 60° for 40 hrs. | | 55.5 | 59.42 | 81.2 | 18.8 | | | 178 |
| 3 | Tri-(2-methyl allyl) phosphate | 25 | 75 | 30° for 66 hrs. 60° for 12 hrs. | | 60.5 | •59.02 | 80.6 | 19.4 | 110 | 160 | 160 |
| 4 | Diphenyl mono-2-methyl allyl phosphate | 10 | 90 | 40 | 10 | 6.5 | 62.21 | 85 | 15 | 176 | 195 | |

The examples have shown the preparation of co-polymers of vinylidene chloride with triallyl borate, allyl orthosilicate, diphenyl 2-methyl allyl phosphate, and tri-(2-methyl allyl) phosphate. Another co-polymer of the type herein-described has been prepared employing chloroallyl chloride. The corresponding phosphites may be co-polymerized in a like manner. Similar co-polymers may be prepared by the inter-polymerization of allyl phosphates, 2-methyl allyl orthosilicate, tri-(2-methyl allyl) borate, or the corresponding 2-chloroallyl esters of these acids, and vinylidene chloride. Similarly, the crotonyl and cinnamyl esters of hydrochloric, phosphoric, phosphorous, orthosilicic, and boric acids may be employed in the preparation of co-polymers. The rates of reaction vary considerably among these various esters and it is to be understood that esters containing higher molecular weight radicals, such as the cinnamyl radical, usually polymerize more slowly than do the esters containing such simple radicals as the allyl group. In all cases the ester employed in the preparation of the co-polymer contained an inorganic acid radical and an unsaturated alcohol residue of the type previously defined. The inorganic acids whose esters have been employed are hydrochloric, phosphoric, phosphorous, orthosilicic, and boric acids. The co-polymer of vinylidene chloride and 2-chloroallyl chloride is not as readily molded as are the co-polymers described in the table. All of our new co-polymeric products, however, are capable of being heated to their softening point and then drawn into strong pliable fibers, which, owing to the chemical-resistant nature of the co-polymeric products are useful for a variety of purposes.

While this invention contemplates principally the co-polymers from a binary polymerizable mixture of vinylidene chloride and the previously defined unsaturated esters of inorganic acids, it also includes co-polymers from polynary polymerizable mixtures comprising vinylidene chloride, the inorganic acid esters, and one or more additional polymerizable materials. For example, to provide a co-polymer which, when molded, will neither dissolve nor swell in boiling orthodichlorobenzene, a small amount, i. e., from 0.5 to 2.0 per cent of allyl methacrylate may be added to the monomeric mixture prior to polymerization.

Our new co-polymers may be further modified in their physical properties and general appearance and utility by incorporating therein various effect materials, such as coloring agents, fillers, and plasticizers. Such materials may be added in any expedient manner, before or after co-polymerization, depending on the effect such materials may have on the polymerization rate of the monomers or on the properties of the finished co-polymer.

Other modes of applying the principle of our invention may be employed instead of those explained, change being made as regards the materials or process employed, provided the ingredients or steps stated by any of the following claims or the equivalent of such stated ingredients or steps be employed.

We therefore particularly point out and distinctly claim as our invention:

1. A co-polymer of vinylidene chloride and other polymerizable materials, at least one of which is an unsaturated ester of an inorganic acid selected from the group consisting of hydrochloric, phosphoric, phosphorous, orthosilicic, and boric acids, the alcohol residue in the ester having the general formula

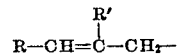

wherein one of the radicals R and R' is hydrogen, R is a member of the class consisting of hydrogen, the phenyl radical, and the lower alkyl radicals, and R' is a member of the class consisting of hydrogen, halogen, and the lower alkyl radicals.

2. A co-polymer of vinylidene chloride and an allyl ester of an inorganic acid selected from the group consisting of hydrochloric, phosphoric, phosphorous, orthosilicic, and boric acids.

3. A co-polymer of vinylidene chloride and a 2-methyl allyl ester of an inorganic acid selected from the group consisting of hydrochloric, phosphoric, phosphorous, orthosilicic, and boric acids.

4. A co-polymer of vinylidene chloride and a 2-chloroallyl ester of an inorganic acid selected from the group consisting of hydrochloric, phosphoric, phosphorous, orthosilicic, and boric acids.

5. A co-polymer of vinylidene chloride and allyl orthosilicate.

6. A co-polymer of vinylidene chloride and tri-(2-methyl allyl) phosphate.

7. The process which comprises mixing monomeric vinylidene chloride with the monomeric form of allyl orthosilicate and subjecting the mixture to polymerizing conditions.

8. The process which comprises mixing monomeric vinylidene chloride with the monomeric form of trimethallyl phosphate and subjecting the mixture to polymerizing conditions.

9. The process which comprises polymerizing a mixture of monomers of vinylidene chloride and an unsaturated ester of an inorganic acid selected from the group consisting of hydrochloric, phosphoric, phosphorous, orthosilicic, and boric acids, the alcohol residue in the ester having the formula

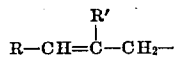

wherein one of the radicals R and R' is hydrogen, R is a member of the class consisting of hydrogen, the phenyl radical, and the lower alkyl radicals, and R' is a member of the class consisting of hydrogen, halogen, and the lower alkyl radicals.

10. The process which comprises mixing monomeric vinylidene chloride with the monomeric form of an allyl ester of an inorganic acid selected from the group consisting of hydrochloric, phosphoric, phosphorous, orthosilicic, and boric acids, and subjecting the mixture to polymerizing conditions.

11. The process which comprises mixing monomeric vinylidene chloride with the monomeric form of a methallyl ester of an inorganic acid selected from the group consisting of hydrochloric, phosphoric, phosphorous, orthosilicic, and boric acids, and subjecting the mixture to polymerizing conditions.

12. The process which comprises mixing monomeric vinylidene chloride with the monomeric form of a chloroallyl ester of an inorganic acid selected from the group consisting of hydrochloric, phosphoric, phosphorous, orthosilicic, and boric acids, and subjecting the mixture to polymerizing conditions.

EDGAR C. BRITTON.
CLYDE W. DAVIS.
FRED LOWELL TAYLOR.